April 23, 1963 T. E. EINSELE 3,086,706

DATA PROCESSING MACHINE

Filed Nov. 27, 1959 4 Sheets-Sheet 1

INVENTOR
THEODOR E. EINSELE

BY [signature]
ATTORNEY

April 23, 1963 T. E. EINSELE 3,086,706

DATA PROCESSING MACHINE

Filed Nov. 27, 1959 4 Sheets-Sheet 2

April 23, 1963 T. E. EINSELE 3,086,706

DATA PROCESSING MACHINE

Filed Nov. 27, 1959 4 Sheets-Sheet 3

3,086,706
DATA PROCESSING MACHINE

Theodor E. Einsele, Sindelfingen, Germany, assignor to International Business Machines Corporation, New York, N.Y., a corporation of New York Filed Nov. 27, 1959, Ser. No. 855,618
Claims priority, application Germany Nov. 29, 1958
13 Claims. (Cl. 235—61.6)

This invention relates to data processing machines and particularly to improved structure for reducing the cost of such machines.

When processing information in electronic data processing machines of known types, the information to be processed is first entered into storage units and from there, as determined by the program, applied to special computing circuits from where it is read into special predetermined locations in storage. This type of information processing requires a considerable number of technical components for addressing purposes in the programming and storage parts of the machines, so that this type of data processing has been restricted to relatively large and costly systems.

An object of this invention is to provide improved means for adapting electronic computer techniques to smaller machines.

Another object is to provide improved means for combining information contained in two or more storage units.

In a preferred embodiment of this invention all the positions of individual storage units, regardless of whether or not they are required in the current phase of the information processing operation, are read out synchronously and commonly applied to suitable computing circuits and after having been processed are entered into the same positions of one or a plurality of said storage units. It is to be understood that the term "synchronous readout" also applies to readout with a phase shift of 0°–360° referred to the spacing of two successive information elements. The information flow may take place in such a manner that the bits, characters and/or words are read out in a serial, parallel or mixed serial-parallel manner.

The beginnings of words, the ends of words and the algebraic signs of words are fixed by means of a separate storage unit wherein simultaneously the operational instructions for the succeeding positions are formed in such manner that the customary storage location addressing is replaced with an operation addressing system. By virtue of logical decisions made during the flow of information certain locations in storage are addressed. Since the entire available information is applied to the units processing it and read out of them again, storage addressing may be replaced with operation addressing.

According to the preferred embodiment of the present invention information contained in punched cards are scanned line by line and read into a single-line storage unit capable of being read out order by order through one common output line. All orders of the storage unit, regardless of whether or not information is present therein, are after each line scanning operation in a cyclic sequence read out serially through an input coding circuit. The information thus obtained is order by order processed with the corresponding orders of a computing storage unit containing coded information. The results are read into the same orders of the computing storage unit. All columns of a card are simultaneously read by brushes. The brush pulses effect a simultaneous entry of the yes-no information contained in one row of the card into a single row input storage unit. It is to be understood that the term single-row storage unit pertains to a series of interconnected storage elements each suited to receive one binary information bit and being read into simultaneously or in a timed sequence and being read out successively through one common line.

In the punched card technique numerical values are represented by perforations, e.g. a hole in the first row from the top represents the value "0," a hole in the second row the value "1," a hole in the third row the value "2" and so forth. In machines the functioning of which is synchronized by the card passage, pulses occurring during the sensing of the first, second, etc. rows are weighted with the values "0," "1," "2," etc. The values assigned to the corresponding rows will be called "index times" below.

If a value contained in the computing storage unit, which may be designed as a seven-order biquinary storage unit including magnetic cores arranged in 7 rows is read out order by order through the output coding circuit, a pulse will occur at the output of that circuit only if the values read out during one particular index time correspond with the value corresponding to that index time. Thus, during index time "4" only the values "4" contained in the computing storage unit will reach the corresponding orders of the output storage unit in the form of simple pulses although all orders of the computing storage unit are read out during each index time.

In this manner, the readout to punching or printing units is effected by reading out the contents of the computing storage unit at each index time through an output coding circuit. In the output coding circuit, the values contained in the individual orders are compared with the values corresponding to the respective index time, the pulses produced on coincidence being entered into the corresponding order positions of a single row or line output storage unit in a serial manner. Thus, each numerical value stored in the computing storage unit and corresponding to a certain index time is at the corresponding index time read into the output storage unit which may through suitable amplifying members operate the printing or punching units. The values appearing at the outputs of the output storage unit occur in the same manner and sequence as in the case of the sensing of a punched card. Thereafter, the printing or punching units employed may be selectively used for reproducing the values directly supplied by the sensing of punched cards or for reproducing the values occurring at the output of the output storage unit. It is immaterial whether the values contained in the output storage unit are presented at each index time to the above-mentioned reproducing units in parallel or in series. It is only necessary to make provisions that the individual output pulses are of such a length that at a given time all of the information occurring in one line is simultaneously available in the form of pulses for operating the corresponding input elements of the printing or punching units simultaneously in all orders. If the above-mentioned output storage unit is designed as a magnetic core storage unit, it may be advisable to apply the pulses produced in writing into the individual cores to amplifier units wherein the pulses are lengthened and amplified to meet the above-mentioned requirements. In that case, it is possible to employ the readout of the values, which actually takes place in series, in an arrangement for which parallel input is necessary. The machine of the preferred embodiment of the present invention may be programmed as a parallel machine, as is desirable with punched card machines.

Accordingly, another object of this invention is to provide an improved serial data processing machine that may be programmed as a parallel machine.

For adding words recorded in different columns of the record carriers or stored in different order positions of the computing storage unit, the outputs of the readout storage unit are connected to the corresponding inputs of the input storage unit.

Another object of this invention is to provide an improved data processing machine wherein a record card may be utilized as a storage location from which an arithmetic operation may be performed.

A further object is to provide an electronic data processing machine with a reduced number of components.

The foregoing and other objects, features and advantages of the invention will be apparent from the following more particular description of a preferred embodiment of the invention, as illustrated in the accompanying drawings.

Figure 1:
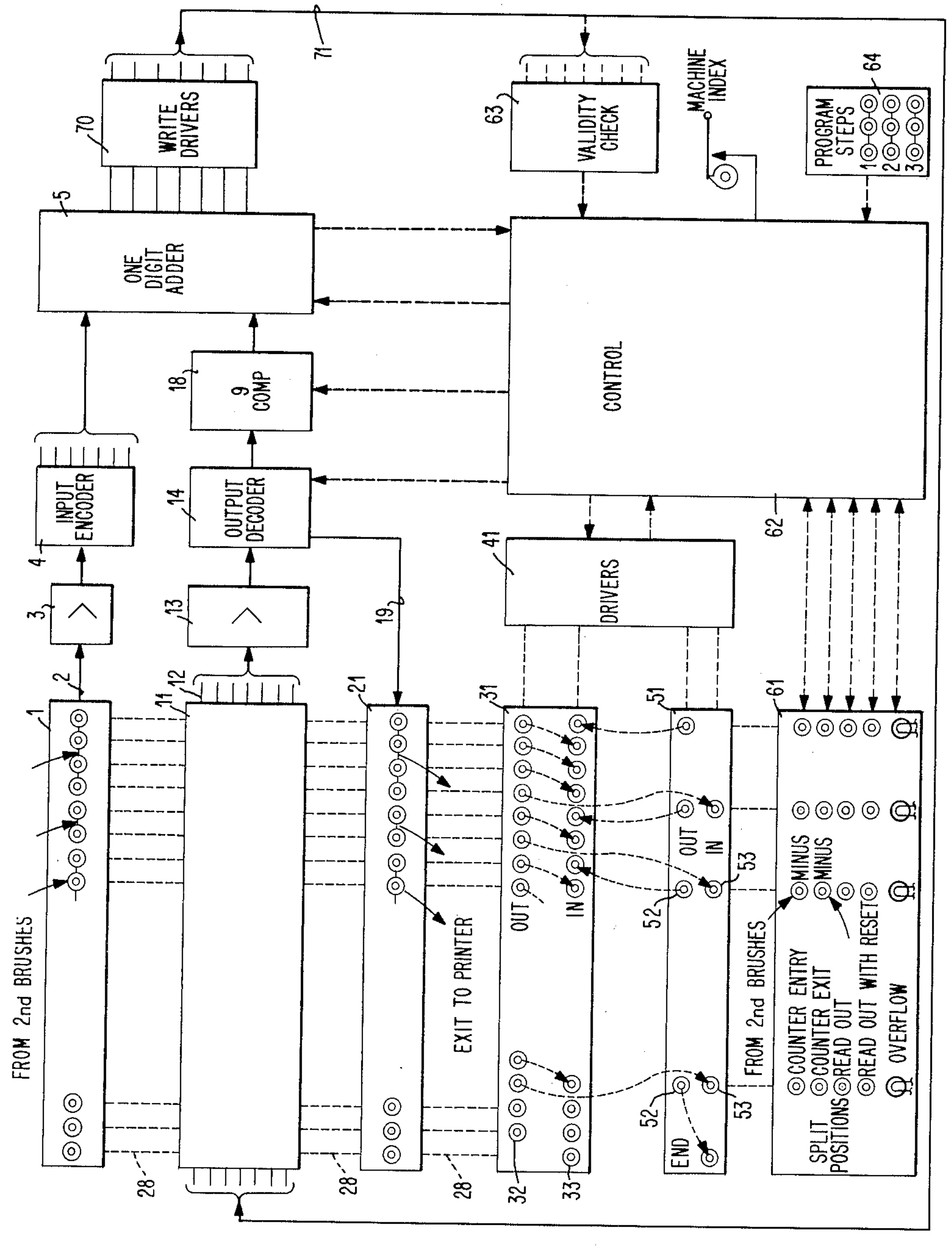
FIG. 1 is a block diagram of the circuit arrangement of a machine constructed in accordance with the present invention.

Referring to FIG. 1, the punched cards to be analyzed are read by means of brushes not shown into the magnetic core input storage unit 1. The read-in of the values associated with the individual columns of a card is effected simultaneously by the brush currents produced by the presence of holes. After the entry of all values punched in the respectively scanned row of the card, the contents of the magnetic core storage unit 1 are order by order read by pulses from a magnetic core shift storage unit 31 and applied through the signal conductor 2 to the amplifier 3 and thence to an input coding circuit 4 wherein the values from the storage unit 1 which are represented by yes-no pulses are converted into the values corresponding to the respective index times in a biquinary form and directed to the computing circuit 5. Thus, for example, during index time 5, pulses are read out of the storage unit 1 which in the circuit 4 are converted to a biquinary form into the digital values 5 and applied to the circuit 5. At the same time and by the same pulses from shift storage unit 31, the individual orders of a seven-line computing storage unit 11 are through lines 12, amplifier 13, output decoding circuit 14, which is ineffective in this case, and through the circuit 18 applied to the same computing circuit 5 wherein they are decimal order by decimal order processed together with the values coming out of the storage unit 1. The processing result is through a write driver circuit 70 and a conductor 71 directed to the computing storage unit 11 and written into the same orders of that storage unit. Thus, after a corresponding number of card passages the computing storage unit 11 contains the sum of the amounts contained in those cards and to be added which is through an output storage unit 21 read out into the printing or punching units connected to the output of storage unit 21. For this purpose, the computing storage unit 11 is by means of the shift storage unit 31 read out order by order through readout conductors common to each of the seven storage rows. The values represented in a biquinary fashion in this storage unit 11 are amplified in the amplifier 13 and compared in the output coding circuit 14 with the values corresponding to the respective index time. If, for example, the readout of the computing storage unit 11 occurs during index time 7, all digits read out of the storage unit 11 and corresponding to the value 7 will produce a pulse at the output of the circuit 14, which through the conductor 19 is applied to the output storage unit 21 and stored in the corresponding orders in the form of ON conditions of the cores. All other values read out of the computing storage unit 11 do not produce an output pulse in the output decoding circuit 14 during that index time. At the same time, all values read out of the individual orders of the storage unit 11 are applied through the circuits 18, 5 and 70 as well as the conductor 71 to the input of the computing storage unit and rewritten into the same order positions. This operation is effected by the ring type operation at the shift storage unit 31 which occurs once during each index time and in each order produces a read pulse and shortly thereafter a part-write pulse. The part-write pulse is complemented by the second part-write pulses coming out of the write driver circuit 70 in such a manner that both pulses will effect writing into the selected cores.

As shown above, the input storage unit is during each index time read out together and in synchronism with the computing storage unit and in this particular case also with the output storage unit order by order. Regardless of whether or not they contain any information, the read-out order positions are through corresponding switching circuits directed to the computing circuit 5 wherein they are processed and thereafter written back into the same order positions of the computing storage unit 11. The fact that the computing circuit 5 also processes the contents of storage cells with the information content "0" is a particularly outstanding characteristic of the present invention and permits a very thorough simplification of the entire system, especially of the control and programming part thereof, which insures an extreme reduction in price and reliable operation.

Figure 4:
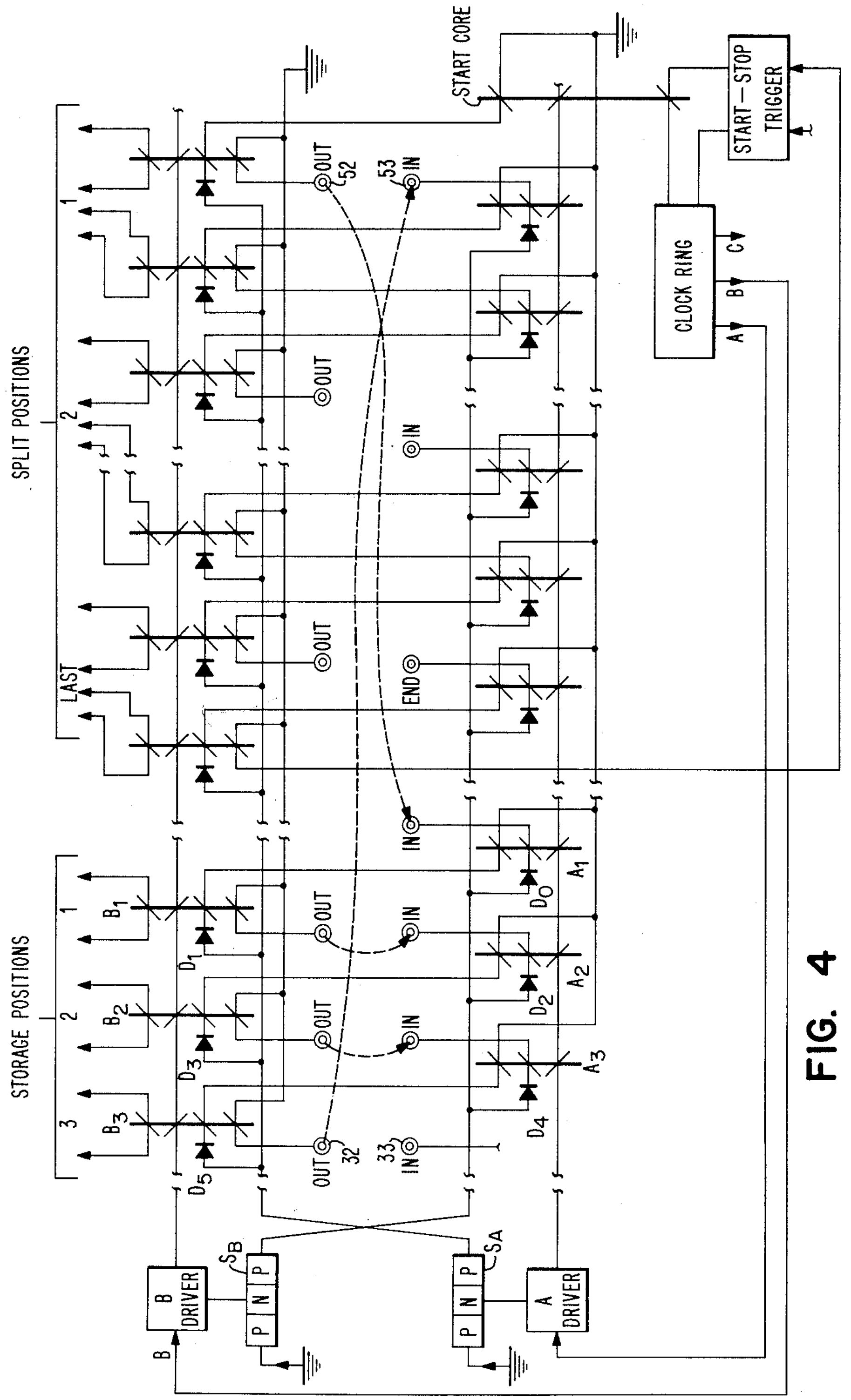
FIG. 4 is a circuit diagram of the first and second magnetic core shift storage units.

The magnetic core shift storage unit 31, which is operated by the driver unit 41, consists of magnetic cores arranged in two rows. As shown in detail in FIG. 4, these magnetic cores are order by order combined into groups comprising two magnetic cores each. Each of said groups is provided with output and input hubs 32 and 33, respectively, which by means of plug connections are connected either with other hubs 32, 33 or with hubs 52, 53 of a second magnetic core shift storage unit 51. Said second magnetic core shift storage unit, as shown in the right-hand portion of FIG. 4, comprises four cores per order and is designated as a splitting order shift storage unit, whereas the lefthand portion of FIG. 4 is termed a storage order shift storage unit. Both storage units shown in FIG. 4 are operated by the common driver unit 41. The ON condition is entered into the storage unit 31 out of the storage unit 51 and passes through that storage unit through plug wires connecting the individual orders and arranged between hubs 32, 33. At the end of the magnetic core group assigned to the storage positions of a word, the pulse representing the ON condition is also through plug connections taken from a hub 32 of the storage unit 31 and applied to one of the hubs 53 of the splitting order shift storage unit 51. After having passed four magnetic cores, the ON condition is again through a plug connection applied to the next or any other order of the storage unit 31 through which it thereafter passes again up to the end of this word, from where it reaches the splitting order shift storage unit 51 again through another plug connection, and so forth. The splitting order shift storage unit 51 operates another magnetic core storage unit 61 effecting the storage of the sign and the overflow in the highest order of each word. Moreover, considering the sign and the highest order, there are formed in this storage unit operational instructions which, among other things, determine whether or not the corresponding words are to be complemented in the circuit 18. Furthermore, the entire system is provided with a control circuit 62, a code checking circuit 63 and a programming table 64 supplying corresponding control pulses.

DETAILED DESCRIPTION

The known electronic systems operating with punched card input, include a special input storage unit. Said storage unit serves as a buffer between the speeds of the input and the electronic information processing operations which differ by some orders of magnitude. It reduces the dead time for the electronic equipment and thereby increases its efficiency. If the information is read out of the card index by index, for example, at index time "9" all orders having the digital value 9, at index time "8" all orders having the digital value 8, etc., the input storage unit must take care that at the end of the card passage a complete piece of information is available. The latter is then, as in earlier solutions, directly applied to the information processing system or again transferred into the computing or main storage unit from where it may, irrespective of the input, be called up for information processing. The first solution has the advantage that the input storage unit is also available as a computing storage unit, the latter that the input time is not lost for the computation.

In adding two numbers, all electronic solutions, as far as it is known, are based on the fact that both terms of the sum are available in a complete form, irrespective of whether the digits are processed in parallel or in series. However, that is not at all necessary. The correct result is also obtained if only one of the two terms of the sum is complete and all digits of the second one are somehow added thereto true to order. Thus, it is for example possible to add the 10 digital weights 0 . . . 9 in 10 adding cycles in any desired sequence. This fact is utilized by the system of the present application inasmuch as the contents of the card are index by index added to the contents of the computing storage unit without intercalating an input storage unit storing the contents of an entire card.

The numerical information is read out of the card by means of the brushes and applied to the counter input. The latter comprises a series of storage cores which is written into only if a brush pulse, i.e. a hole in the card, is present. As to each order of the computing storage unit 11 a storage core of the input is assigned, in the addition sweep following the brush time the input core is read out together with the computing storage unit. If the above causes the input core to emit a signal, that bit is in the input coding circuit 4 encoded into the existing index time. In the biquinary code, both characters will then be applied to the input of the single-order decimal adder 5. The result of addition is in the subsequent printing cycle written into the order of the computing storage unit 11 which has just been read out. That completes the serial by character, parallel by bit information processing operation. Whenever the card is not punched and consequently the input core has not been written into, the input coder 4 supplies the digital value 0 to the adder 5. The output decoder 14 and nine's complement circuit 18 are connected through on addition. The adding operation may be terminated with index time "1," for the addition of 0 at index time "0" will not change the result. Although the machine now has to perform altogether nine adding cycles instead of a single one, this "extra work" is compensated by the saving of a special input storage unit.

The following numerical example is given for an even better understanding of the adding method, it being assumed that the numerical value is contained in the first four orders of the computing storage unit.

Problem:

| | |
|---|---|
| (Computing storage unit) | 0347 |
| +(Card) | 0259 |
| (Computing storage unit)* | 0606 |

Solution:

| | |
|---|---|
| "11" (Computing storage unit) | 0347 |
| | +0009 |
| "9" (Computing storage unit) | 0356 |
| | +0000 |
| "8" (Computing storage unit) | 0356 |
| | +0000 |
| "7" (Computing storage unit) | 0356 |
| | +0000 |
| "6" (Computing storage unit) | 0356 |
| | +0050 |
| "5" (Computing storage unit) | 0406 |
| | +0000 |
| "4" (Computing storage unit) | 0406 |
| | +0000 |
| "3" (Computing storage unit) | 0406 |
| | +0200 |
| "2" (Computing storage unit) | 0606 |
| | +0000 |
| "1" (Computing storage unit)* | 0606 |

Such an index-by-index addition does not yet constitute any limitation with respect to the association of the orders to different words. That means, however, that it is not only possible to add all equal digit values within one word but in all existing words.

Between the highest order of one word and the lowest order of the next word, a mark must be applied which is taken over by the so-called splitting order storage unit. The latter may be either fixedly wired or freely accessible (FIG. 1). In the latter case, a variable word length is obtained which is preferable for commercial applications. The programmer forms his words, as shown in FIG. 1, by means of plug connections on the plugboard. The plugging of storage positions is not governed by any regulations, i.e. it is not necessary to start with the first order and it is possible to omit orders in between. That is, however, not possible in the splitting order storage unit. There, it is necessary to start with the first order and to proceed with the second, etc. orders. On the other hand, it is not required that all of the splitting positions are plugged even if not needed. It should also be noted that the output of the last splitting position used is connected to the "end hub."

In all former electronic solutions, a word is subjected to an information processing operation only if such operation should really take place. In contrast thereto, in the present system, fundamentally all plugged positions of the computing storage unit 11 are swept thus subjecting all words to an information processing operation, no matter whether or not such operation is to take place. If no information processing operation is to take place, all zeros are simply added. Thus, this method according to Table I which at first sight appears to be impractical simplifies the electronic arrangement for addressing purposes.

*Table I*

| | |
|---|---|
| (Computing storage unit) | 983 |
| +(Card) | |
| (Computing storage unit)* | 983 |
| | HS V |
| (Computing storage unit) initially | 983+ |
| Sign (minus only) "11" | + |
| Adder input "9" | 983<br>000 |
| (Computing storage unit) "9" | 983<br>000 |
| (Computing storage unit) "8" | 983<br>000 |
| (Computing storage unit) "7" | 983<br>000 |
| (Computing storage unit) "6" | 983<br>000 |
| (Computing storage unit) "5" | 983<br>000 |
| (Computing storage unit) "4" | 983<br>000 |
| (Computing storage unit) "3" | 983<br>000 |
| (Computing storage unit) "2" | 983<br>000 |
| (Computing storage unit) "1" | 983 |
| Converting sweep "0" | 983 |
| Adder input | 000 |
| (Computing storage unit)* "0" | 983+ |

Like addition, subtraction takes place during input in the form of an addition considering the sign of the two terms of the computation:

$$(-^{+}x)+(-^{+}y)$$

If $x$ is positive and $y$ is to be subtracted from $x$, the relation is as follows:

$$(+x)+(-^{+}y)=x-y$$

In general, subtraction is replaced with complement addition:

$$x^{+} \text{ (complement of } y\text{)}$$

For the case that $x$ is stored in the computing storage unit and the value $y$ to be subtracted originates from the punched card, such a complement addition is not possible; an index-by-index complementation of $y$ would lead to incorrect results. It is rather necessary to complement the value $x$ which is completely stored in the computing storage unit, and that only once prior to the first partial addition at index time "9":

$$(\text{complement of } x)+y$$
"9"

The value $y$ is then added out of the card index by index as in addition.

*Table II*

| | |
|---|---|
| (Computing storage unit) | 274 |
| +(Card) | −192 |
| (Computing storage unit)* | 82 |
| | HS V |
| (Computing storage unit) initially | 0274+ |
| Sign (minus only) "11" | − |
| Adder input "9" | 9725<br>0090 |
| (Computing storage unit) "9" | 9815<br>0000 |
| (Computing storage unit) "8" | 9815<br>0000 |
| (Computing storage unit) "7" | 9815<br>0000 |
| (Computing storage unit) "6" | 9815<br>0000 |
| (Computing storage unit) "5" | 9815<br>0000 |
| (Computing storage unit) "4" | 9815<br>0000 |
| (Computing storage unit) "3" | 9815<br>0002 |
| (Computing storage unit) "2" | 9817<br>0100 |
| (Computing storage unit) "1" | 9917 |
| Converting sweep "0" | 0082 |
| Adder input | 0000 |
| (Computing storage unit)* "0" | 0082+ |

The problem of a possibly required conversion of the result for obtaining its absolute value and sign, is solved in such a manner that at index time "0" a converting sweep through the entire computing storage unit is automatically effected. In that process, only those orders of a word are complemented for which the necessary conditions are met. All other orders remain unchanged.

Besides the word mark, the splitting order shift storage unit 61 also stores the conditions for complementation at index time "9" as well as for recomplementation at the end of addition at index time "0." The actual interpretation of those conditions is effected by the control circuit 62 (FIG. 1). Two of said conditions are the signs of the two terms of the computation, i.e. each splitting order must be able to store the sign out of the card and must bear the sign of the computing storage unit 11, the latter becoming the sign of the result when the addition or subtraction has been completed.

The "highest order" which must be provided in electromechanical counters in case of subtraction and the value 9 of which is the criterion for recomplementation, is also accommodated in the splitting order storage unit 61, however with the difference that it is not necessary for the operator to take this into account. As shown in the tables, each splitting order actually comprises two orders. The first order is the "highest order" HS which belongs to the preceding word; the second one is the actual sign position V of the next succeeding word. The "highest order" does not have to be a complete storage position; it is rather sufficient if it comprises one bit capable of storing a possibly occurring end carry $U_e$, as shown in the table hereinbelow (Table III). The other cases listed in that table illustrate the remaining possibilities.

A third function of the splitting order storage unit 61 consists in determining the operations for the orders respectively positioned to the left thereof. In a particular embodiment of the invention, each splitting order contains the following information hubs or control functions, respectively:

| | |
|---|---|
| Counter input | minus |
| Sum | minus |
| Storage readout | |
| Storage readout and erase | |
| Overflow indication | |

The overflow indicator responds if the associated word exceeds its capacity (Table III, Case 8). If desired, it is possible to add to these functions others, such as "counter read-in."

Equal to the read-in, the readout to the printing and/or punching unit has to take place index by index and in parallel in orders and thus is a reversal of the read-in operation. At each index time, the entire computing storage unit 11 is swept, i.e. subjected to an information processing operation with the addition of zeros in all orders and at all index times, and in an output decoder 14 all those orders are picked out the digital values of which correspond with the respective index time (FIG. 1). A coincidence of the digital value and index time appears as a signal in the summary output 21 and initi-

*Table III*

| | Case 8 | Case 7 | Case 6 | Case 5 | Case 4 |
|---|---|---|---|---|---|
| (Computing storage) | 74 | −154 | −73 | −57 | 148 |
| +(Card) | +87 | −94 | +38 | +96 | −835 |
| (Computing storage) | +161 | −248 | −35 | +39 | −687 |
| | HS V | HS V | HS V | HS V | HS V |
| (Comp. storage) initially | 74+ | 154− | 073− | 57− | 00148+ |
| Sign (minus only) "11" | + | − | + | + | − |
| Adder input "9" | 74 | 154 | 926 | 42 | 99851 |
| | 00 | 090 | 000 | 90 | 00000 |
| (Comp. storage) "9" | 74 | 244 | 926 | $U_c$32 | 99851 |
| | 80 | 000 | 008 | 00 | 00800 |
| (Comp. storage) "8" | $U_c$54 | 244 | 934 | 32 | $U_c$00651 |
| | 07 | 000 | 000 | 00 | 00000 |
| (Comp. storage) "7" | 61 | 244 | 934 | 32 | 00651 |
| | 00 | 000 | 000 | 06 | 00000 |
| (Comp. storage) "6" | 61 | 244 | 934 | 38 | 00651 |
| | 00 | 000 | 000 | 00 | 00005 |
| (Comp. storage) "5" | 61 | 244 | 934 | 38 | 00656 |
| | 00 | 004 | 000 | 00 | 00000 |
| (Comp. storage) "4" | 61 | 248 | 934 | 38 | 00656 |
| | 00 | 000 | 030 | 00 | 00030 |
| (Comp. storage) "3" | 61 | 248 | 964 | 38 | 00686 |
| | 00 | 000 | 000 | 00 | 00000 |
| (Comp. storage) "2" | 61 | 248 | 964 | 38 | 00686 |
| | 00 | 000 | 000 | 00 | 00000 |
| (Comp. storage) "1" | 61 | 248 | 964 | 38 | 00686 |
| Converting sweep "0" | 61 | 248 | 035 | 38 | 00686 |
| Adder input | 01 | 000 | 000 | 01 | 00001 |
| (Comp. storage) "0" Overfl. | 62+ | 248− | 035− | 39+ | 00687− |

ates the printing or punching operation. Like the counter input, the summary output consists of a series of storage cores with relay oscillators connected thereto which finally close operating contacts in the summary output. The output cores are read out together with the computing storage unit 11 and the input cores 1 and written into if the output decoder 14 indicates a coincidence of the digital value and the index time. As these relay blocking oscillators are responsive only to write signals, any read signals of the output cores produced in that process are suppressed.

The following table shows five typical cases. In cases 1 and 4, the content of the computing storage unit is maintained beyond index time "0," whereas in cases 3 and 5 the computing storage unit is reset to + zero at index time "0." In case 2 in which no readout is to take place the coincidence signal is suppressed and no reset takes place.

*Table IV*

| | Case 5 | Case 4 | Case 3 | Case 2 | Case 1 |
|---|---|---|---|---|---|
| | RO. Reset HS V | RO. HS V | RO. Reset HS V | HS V | RO. HS V |
| (Comp. Stor.) initially | 0190− | 00835− | 0274+ | 983 | 0259+ |
| Sign minus sum "11" | − | − | + | | + |
| (Comp. Stor.) "9" | 0190 | 00835 | 0274 | 983 | 0259 |
| (Comp. Stor.) "8" | 0190 | 00835 | 0274 | 983 | 0259 |
| (Comp. Stor.) "7" | 0190 | 00835 | 0274 | 983 | 0259 |
| (Comp. Stor.) "6" | 0190 | 00835 | 0274 | 983 | 0259 |
| (Comp. Stor.) "5" | 0190 | 00835 | 0274 | 983 | 0259 |
| (Comp. Stor.) "4" | 0190 | 00835 | 0274 | 983 | 0259 |
| (Comp. Stor.) "3" | 0190 | 00835 | 0274 | 983 | 0259 |
| (Comp. Stor.) "2" | 0190 | 00835 | 0274 | 983 | 0259 |
| (Comp. Stor.) "1" | 0190 | 00835 | 0274 | 983 | 0259 |
| (Comp. Stor.)* "0" | 0000+ | 00835− | 0000+ | 983+ | 0259+ |

In contrast to input with addition, the output is completed only at index time "0" as the printing unit requires an initiating pulse for printing the digit 0. In the absence of such pulse, nothing would be printed, i.e. a blank position would be produced.

The position in time of the readout sweep within the index time is determined by the fact that the printing unit or the punching unit in readout has to be turned on by the electronic counters substantially at the same time as on a direct initiation by brush pulses. Under consideration of the electronic sweeping time as well as of certain delays in the output circuits, it is advisable to let the readout sweep take place prior to the actual brush time. The computing storage unit is swept twice at each index time in order to simplify the controls. In this connection, it should be remembered that at index time "0" a twofold sweep is necessary, the first one for the just mentioned readout, the second one for recomplementation.

For the readout of the summary sign minus at index time "11," the same applies as for the numerical characters.

Similar to the input, this readout method has the advantage that no special complete output storage unit is needed.

If it is required to add two words $W_\mu$ and $W_\gamma$ stored in the computing storage unit 11:

$$W_\mu + W_\gamma = W_\mu +$$

that is not possible in the direct manner as in the customary electronic methods. For, the sweep storage system possesses only one complete channel, viz. from the computing storage unit 11 to the adder 5. The second channel from the input to the adder has no direct connection to the computing storage unit and can carry only index-like information. As an alternative, the detour through the output 21 and the input 1 offers itself. As the machine sweeps the computing storage unit 11 twice at each index time, first for the output and thereafter for the input, the cross transfer does not require any additional equipment. In the output sweep, the word $W_\gamma$ is read out index by index and by means of the external switching connections into the input of $W_\mu$ in the input sweep added again to the value $W_\mu$ index by index. The necessary buffering between output and input is taken care of by the storage cores of the input storage unit 1.

As cross transfers occur only in program cycles and thus are not tied to the speed of the mechanical input and output units, it is possible to let them take place at an increased speed. That results in the possibility of occupying the still unused index times within a card cycle with program cycles.

The computing storage unit 11 is of the type of the ½-dimensional storage matrix wherein the read operation takes place 1-dimensionally, the write operation 2-dimensionally. The numerical characters, represented in the biquinary code with 7 bits, are arranged linearly and successively, which aids the variable word length and the addressing system.

Figure 2:
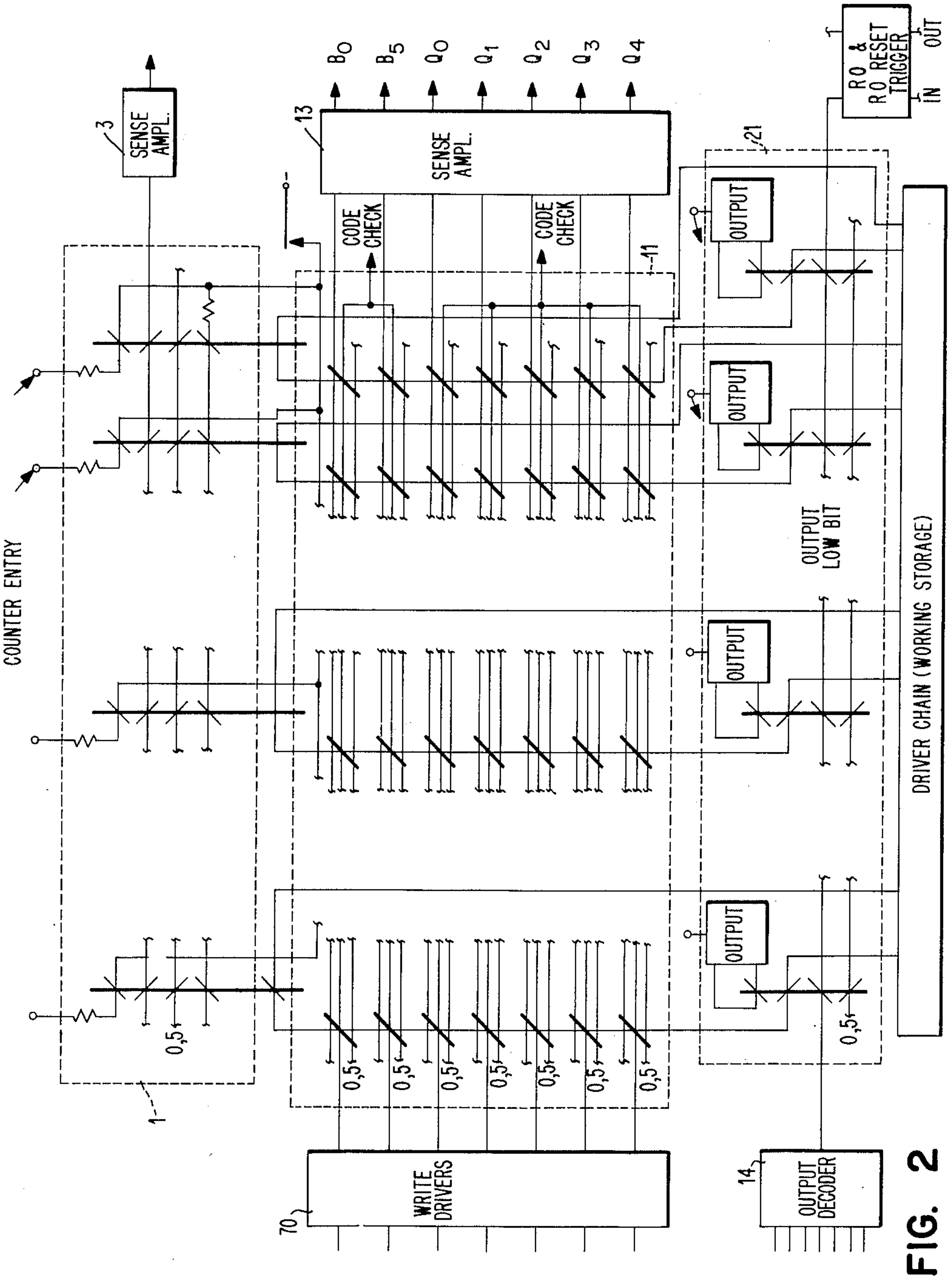
FIG. 2 shows a basic circuit diagram of the input, computing and output storage units for the machine of FIG. 1.
Figure 3:
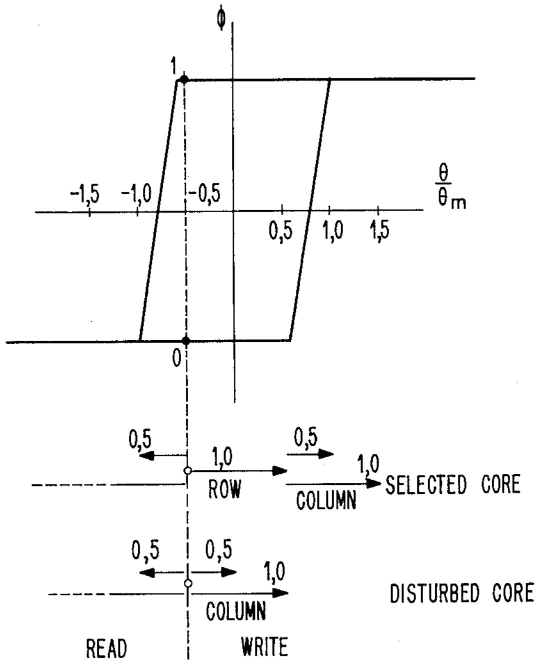
FIG. 3 is a graphic representation of the magnetic hysteresis loop of a single core together with graphic representations of the magnetic bias for the read and write pulses.

With each character there are associated one storage core in the input 1 as well as one storage core in the output 21, all of which are fed by one common column wiring arrangement with pulses for reading and writing (FIG. 2). The pulses themselves are supplied by a driver chain 31 comprising a modified magnetic shift register and to be described hereinbelow. It should, however, be noted that the pulses emitted by said driver chain need not be ideally rectangular. As reading takes place only 1-dimensionally, the storage cores may be biased with the standardized amplitude −0.5 (FIG. 3). It is only necessary for the read pulses emitted by the driver chain to have the minimum amplitude of 0.5, otherwise they may have any desired magnitude. If care is further taken that the write pulse on the line conductors with the standardized amplitude of 1.0 has a good rectangular shape, which may be easily achieved with the customary write drivers, a variation in amplitude of 0.5 . . . 1.0 is permissible for the column write pulses. That affords sufficient protection against amplitude irregularities and deficient pulse shapes, so that it is possible to employ a simple driver chain.

The magnetizing conditions for the storage cores in the input and output are the same as for the computing storage unit 11. Writing into the input storage cores 1 is effected by a coincidence of a brush and a line pulse, the latter being present at each numerical index time. Writing into the output storage cores requires a coincidence of the column write pulse with a pulse from the output decoder 14.

The driver problem for the computing storage unit 11 and the demand for variable word lengths is solved in a relatively simple manner in the present embodiments with a magnetic shift register 31. In its fundamental structure it corresponds to a two-cycle shift register having two storage cores per bit and two diodes per bit. As the output signals of the shift registers are without further amplification and shaping to be directly used as driver pulses for the computing storage unit, it is not possible to use the otherwise customary coupling resistors in order to avoid losses.

FIG. 4 shows how the problem of the possibly lossfree power transmission from one core to another has been solved. At cycle time A, the ON condition of a transistor switch $S_A$ closes all coupling loops from the A to the B driver cores and at the same time all coupling loops from the B to the A driver cores are interrupted by the OFF condition of another transistor switch $S_B$. The mutual decoupling of the individual loops is effected by the diodes $D_1$, $D_3$, $D_5$ . . . and $D_0$, $D_2$, $D_4$ . . ., respectively. At cycle time B, all loops from the B to the A driver cores are closed, whereas those from the A to the B driver cores are interrupted. This alternating closure and interruption of the coupling loops insures that the information flows only in one direction, in the present case from right to left. The driver pulses for the computing storage unit as well as for the storage cores in the splitting positions are taken from the B cores with a winding.

The operation of the shift register for the storage positions will now be discussed in connection with FIG. 4, lefthand portion. Assuming that the driver core $A_2$ is in its point of positive remanence, i.e. in state "1," while all other A and B driver cores are in state "0," at cycle time A the driver core $A_2$ is read out by the A driver pulse and applies its information through the closed coupling loop to the driver core $B_2$. Simultaneously with the setting of the driver core $B_2$, a read pulse is applied by transformer action to the computing storage unit. As the coupling loop, which is wired completely internally, does not include, besides the diode $D_3$ and the transistor switch $S_A$ in the range of saturation, any notable inductances and ohmic resistances, the rise time of the emitted read pulse and the effectiveness of power transmission from the A driver pulse to the actual read pulse are not deteriorated.

At cycle time B, the driver core $B_2$ is read out and produces in its output winding the column write pulse for the computing storage unit. At the same time, however, the driver core $A_3$ is set through the coupling loop now closed by the transistor switch $S_B$. In contrast to the internally connected coupling loops from the A to the B driver cores, the loops from the B to the A driver cores are only completed by an external switching connection. The latter if properly dimensioned has only little influence on the internal write operation in the computing storage unit, as the power needed for that purpose is transmitted directly from the B driver pulse to the output winding. The coupling loop is arranged in parallel to the output circuit, and it is only necessary to take care that the driver core $A_3$ is certain to be set by a sufficiently long B driver pulse. The righthand portion of FIG. 4 illustrates the driver chain for the splitting order storage unit which differs from that just discussed only in that a splitting position requires a double position in the shift register, i.e. four storage cores and four diodes. Otherwise, the operation is exactly the same.

Each splitting position consists of a sign order and a "highest order." As seen from the driver chain, a splitting position starts with the "highest order" of the preceding word and ends with the sign order of the next following word. On the other hand, the outputs are combined in correspondence with the storage operations necessary for a splitting position and also in accordance with the plugboard arrangement (FIG. 1). That means that between the sign order, e.g. of the first splitting position, and its associated "highest order" there exists no internal fixed wiring but that between both it is possible by means of external plug connections to intercalate any desired number of storage positions. In FIG. 4, there are altogether three of them. From the structure of the splitting positions it may be seen that it is always necessary to use one splitting position after the other, starting with the first one. If a splitting position were skipped, the "highest" order would be lost. For the same reason, it is a further requirement that the highest storage position of the last word is plugged into the "end hub" in case all splitting positions are needed. If, however, not all splitting positions are needed, the highest storage position must be plugged into the next splitting position in order to avoid loss of the "highest order" of the last word also in that case. In addition thereto, it is necessary to connect the output of this last used splitting position to the "end hub."

The first splitting position in its sign portion contains the starting core for the entire driver chain (FIG. 4). It is set by the OFF condition of the start-stop trigger, i.e. a "1" is written into it. In parallel thereto, another starting core is set in the basic ring, which is not shown here. If now the start-stop trigger is turned on, the basic ring starts running emitting at its three outputs cycle pulses in the sequence: C, A, B, C, A, B, C . . ., for example. Cycle pulse C is the over-all reset pulse, cycle pulse A effects readout, and cycle pulse B effects writing into the computing storage unit and of other stored values in the storage part. The starting core is read out by the first A driver pulse and transmits its "1" to the succeeding core, reading out the sign conditions of the first word. By the B driver pulse, the "1" is shifted into the driver core $A_1$ of the first storage position. On the next A driver pulse, the "1" reaches the driver core $B_1$, reading out the first order of the first word, etc. In this manner the "1" written into the starting core of the magnetic shift register runs through all plugged splitting and storage positions, emitting the desired read and write pulses. When the "1" has reached the "end," the start-stop trigger is set OFF and the basic ring stops with a C pulse.

It should also be mentioned that the splitting order storage unit 61 effects the storage of information and operations basically in the same manner as the storage units 1, 11 and 21.

While the invention has been particularly shown and described with reference to a preferred embodiment thereof, it will be understood by those skilled in the art that various changes in form and details may be made therein without departing from the spirit and scope of the invention.

What is claimed is:

1. In a data processing machine wherein record cards are read parallel by column and serially by index positions comprising in combination a single row of binary storage elements for reading data from a card one index position at a time, a storage device for storing a word of data, a data processing unit, and means for simultaneously feeding data from said storage device and from said binary storage elements to said processing unit for each index position of said record.

2. Apparatus for adding a first value stored in a field of a record to a second value wherein like characters of said first value are read simultaneously and unlike characters are read successively comprising in combination an adder having input means and output means, a data storage device for storing said second value, first means for transmitting the characters of said first value to said input means of said adder in the sequence in which the characters are read, second means for repeatedly transmitting the data stored in said storage device to said input means of said adder simultaneously with each transmission of like characters of said first value to said input means and third means connecting said output means of said adder to said storage device whereby partial sums are successively stored in said storage device.

3. Apparatus according to claim 2 wherein said first means comprises a row of binary storage elements for storing binary bits indicating simultaneously read characters of said first value.

4. Apparatus according to claim 2 wherein said first means comprises translator means for receiving and translating characters successively applied thereto and means for indexing said translator means to alter the translation of successively read characters of said first value.

5. Apparatus according to claim 3 wherein said first means further comprises means for serially scanning said row of binary storage elements.

6. Apparatus according to claim 3 wherein said first means further comprises translator means for receiving and translating binary bits into a different system of notation, means for transmitting the binary bits from said row of binary storage elements to said translator and means for indexing said translator means to alter the translation of binary bits transmitted thereto.

7. Apparatus according to claim 6 wherein said first means further comprises means for serially scanning said row of binary storage elements and wherein said translating means sequentially translates binary bits transmitted thereto.

8. Apparatus according to claim 7 wherein said first means further comprises means for sequentially transmitting like characters from said translator means to said input means of said adder and wherein said adder is a single character adder.

9. Apparatus according to claim 8 wherein said second means comprises means for sequentially transmitting characters from said storage device to said input means of said adder simultaneously with the transmission of characters from said translating means.

10. Apparatus according to claim 9 wherein said third means comprises means for sequentially transmitting characters representing partial sums from said output means of said adder to said storage device to replace the characters transmitted therefrom.

11. Apparatus according to claim 10 wherein said row of binary elements comprises a row of magnetic core elements.

12. Apparatus according to claim 11 wherein said indexing means is synchronized with the reading of a record containing said first value.

13. Apparatus according to claim 12 wherein said indexing means indexes said translator to translate a binary bit from said row of cores to the value represented by the index position read from a record containing said first value.

References Cited in the file of this patent

UNITED STATES PATENTS

| | | |
|---|---|---|
| 1,916,997 | Tauschek | July 4, 1933 |
| 2,702,380 | Brustmon et al. | Feb. 15, 1955 |
| 2,750,113 | Coleman | June 12, 1956 |
| 2,848,535 | Hunt | Aug. 19, 1958 |